(12) United States Patent
Favaretto

(10) Patent No.: US 8,317,272 B2
(45) Date of Patent: Nov. 27, 2012

(54) BRAKING SYSTEM FOR A VEHICLE TO CONTROL A REGENERATIVE BRAKING

(75) Inventor: Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 434 days.

(21) Appl. No.: 12/603,830

(22) Filed: Oct. 22, 2009

(65) Prior Publication Data

US 2010/0102622 A1    Apr. 29, 2010

(30) Foreign Application Priority Data

Oct. 23, 2008 (IT) .............................. BO2008A0651

(51) Int. Cl.
*B60T 8/64* (2006.01)
(52) U.S. Cl. ........................................................ 303/151
(58) Field of Classification Search ............... 303/151, 303/152, 20; 74/470, 512, 514, 560; 180/65.1, 180/65.21, 65.31
See application file for complete search history.

(56) References Cited

U.S. PATENT DOCUMENTS

| | | | | |
|---|---|---|---|---|
| 5,563,355 A | * | 10/1996 | Pluta et al. | ........................ 74/512 |
| 6,176,556 B1 | | 1/2001 | Kizer | |
| 6,425,643 B2 | * | 7/2002 | Shirai et al. | ..................... 303/152 |
| 7,232,192 B2 | * | 6/2007 | Teslak et al. | .................... 303/152 |
| 7,419,227 B2 | * | 9/2008 | Marlhe et al. | ............... 303/113.4 |
| 7,922,265 B1 | * | 4/2011 | Cottrell, V | ..................... 303/152 |
| 8,070,239 B2 | * | 12/2011 | Itoh | ................................ 303/152 |
| 2008/0303340 A1 | * | 12/2008 | Crombez et al. | .............. 303/152 |

FOREIGN PATENT DOCUMENTS

| | | |
|---|---|---|
| DE | 19750997 | 5/1999 |
| EP | 0834671 | 4/1998 |
| WO | 2005/014351 | 2/2005 |
| WO | 2005/102804 | 11/2005 |

OTHER PUBLICATIONS

Search Report for Italian Patent Application No. BO2008A000651; Sep. 3, 2009.

* cited by examiner

*Primary Examiner* — Thomas J Williams
(74) *Attorney, Agent, or Firm* — Bryan A. Santarelli; Graybeal Jackson LLP

(57) ABSTRACT

An embodiment of a braking system for a vehicle to control a regenerative braking; the braking system is provided with: a plurality of hydraulically operated mechanical brakes; a hydraulic braking circuit connected to the mechanical brakes; a brake pump to raise pressure in the hydraulic braking circuit; a brake pedal mobile between a resting position and a maximal braking position; a connecting cap, which mechanically connects the brake pedal to the brake pump, and is divided into two reciprocally independent parts; an elastic system which tends to push the brake pedal towards the resting position; a position sensor to read the position of a part of the connecting cap integral to the brake pedal; and a pilot system to pilot an energy recovery system for effecting a regenerative braking and uses the position of the part of the connecting cap integral to the brake pedal provided by the position sensor.

11 Claims, 2 Drawing Sheets

BRAKING SYSTEM FOR A VEHICLE TO CONTROL A REGENERATIVE BRAKING

PRIORITY CLAIM

The instant application claims priority to Italian Patent Application No BO2008A000651, filed Oct. 23, 2008, which application is incorporated herein by reference in its entirety.

TECHNICAL FIELD

An embodiment of the present invention relates to a braking system for a vehicle to control a regenerative braking.

BACKGROUND

A hybrid vehicle comprises an internal combustion engine, which transmits the torque to the drive wheels by means of a transmission provided with a gearbox, and at least one electric motor which is electrically connected to an electric storage system and is mechanically connected to the drive wheels.

In order to increase the overall energy efficiency during all steps of decelerating, the electric motor may be used as a generator for effecting a regenerative deceleration in which the kinetic energy possessed by the vehicle instead of being completely dissipated into heat generated by friction, is partially converted into electricity which is stored in the electric storage system. For this purpose, when the driver presses the brake pedal, a control unit of the braking system does not initially operate the mechanical brakes and pilots the electric motor as a generator, so that the braking torque is generated only by the electric motor; if the driver presses the brake pedal in a more vigorous manner thus requiring a high braking torque which is higher than the capacity of the electric motor, the control unit of the braking system also operates the mechanical brakes.

In the currently marketed traditional braking systems, the mechanical brakes are hydraulically piloted and the brake pedal directly acts on a brake pump which raises the pressure in a braking circuit with the aid of a servo brake system In order to implement the above-described regenerative braking mode, it has been suggested to suppress the mechanical connection between the brake pedal and the brake pump which raises the pressure in the braking circuit; in this case, the position of the brake pedal is detected by a position sensor and according to the brake pedal position read by the position sensor, the control unit of the braking system pilots the electric motor as a generator and, if needed, also operates the mechanical brakes using an actuator (e.g. an electric actuator) coupled to the brake pump which raises the pressure in the braking circuit.

Suppressing the mechanical connection between the brake pedal and the brake pump which raises the pressure in the braking circuit results, however, in fully redesigning the braking system and thus high costs and long manufacturing times. Furthermore, suppressing the mechanical connection between the brake pedal and the brake pump which raises the pressure in the braking circuit makes it difficult to operate the brakes in case of errors or malfunctioning of the position sensor which reads the position of the brake pedal or in the actuator coupled to the brake pump; therefore, adequate redundancies and adequate diagnostics should be provided to ensure a high degree of vehicle driving safety.

Patent applications WO2005014351A1 and WO2005102804A1, which are incorporated by reference, describe a braking system for a vehicle to control a regenerative braking; the braking system is provided with: a plurality of hydraulically operated mechanical brakes; a hydraulic braking circuit connected to the mechanical brakes; a brake pump to raise pressure in the hydraulic braking circuit; a brake pedal mobile between a resting position and a maximal braking position; a connecting cap, which mechanically connects the brake pedal to the brake pump, and is divided into two reciprocally independent parts; an elastic system which tends to push the brake pedal towards the resting position; a position sensor to read the position of a part of the connecting cap integral to the brake pedal; and a pilot system to pilot an energy recovery system for effecting a regenerative braking using the position of the part of the connecting cap integral to the brake pedal provided by the position sensor The mechanical solution used in patent applications WO2005014351A1 and WO2005102804A1 for implementing the elastic system tending to push the brake pedal towards the resting position is, however, particularly complex and expensive.

SUMMARY

An embodiment of the present invention to provide a braking system for a vehicle to control a regenerative braking, which braking system is free from the above-described drawbacks while being easy and cost-effective to be implemented.

BRIEF DESCRIPTION OF THE DRAWINGS

One or more embodiments of the present invention will now be described with reference to the accompanying drawings, which illustrate one or more embodiments in a non-limitative manner, in which.

DETAILED DESCRIPTION

Figure 1:
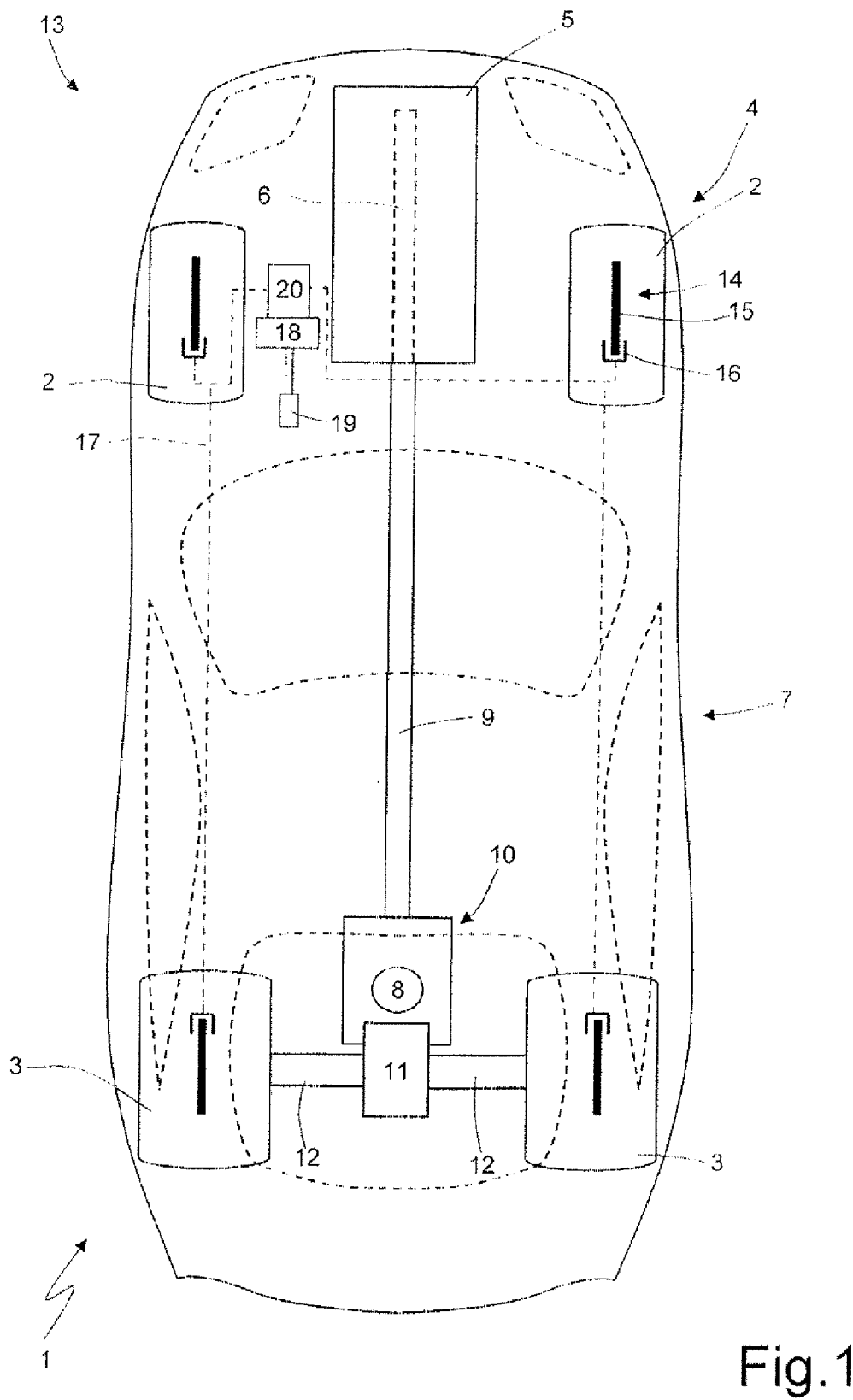
FIG. 1 is a diagrammatic view of a road vehicle with hybrid propulsion provided with a braking system made according to an embodiment of the present invention.

In FIG. 1, numeral 1 indicates as a whole an embodiment of a hybrid vehicle provided with two front wheels 2 and two rear drive wheels 3, which receive the driving torque from a hybrid propulsion system 4

The hybrid propulsion system 4 comprises a thermal internal combustion engine 5, which is arranged in a frontal position and is provided with a drive shaft 6, a servo controlled transmission 7, which transmits the driving torque generated by the internal combustion engine 5 to the rear drive wheels 3, and a reversible electric motor 8 (i.e. which may work either as an electric motor by absorbing electric energy and generating a mechanical driving torque, and as an electric generator by absorbing mechanical energy and generating electricity) which is mechanically connected to the servo controlled transmission 7

The servo controlled transmission 7 comprises a propeller shaft 9 which is angularly integral to the drive shaft 6 on one end and is mechanically connected to a servo controlled gearbox 10 on the other end, which is arranged in a rear position and transmits the motion to the rear drive wheels 3 by means of two axle shafts 12 which receive the motion from a differential gear 11. The reversible electric motor 8 is then mechanically connected to the gearbox 10 and is piloted by an electric drive connected to at least one battery to store electricity; by way of example, a shaft of the reversible electric motor 8 may be mechanically connected (meshed either directly or by interposing a speed reducer and/or a clutch) to a primary shaft of the gearbox 10 or to a secondary shaft of the gearbox 10

Furthermore, vehicle 1 comprises a braking system 13, which is provided with four mechanical disc brakes 14, each of which is coupled to a respective wheel 2 or 3; each disc brake 14 comprises a disc 15, angularly integral to the respective wheel 2 or 3, and a caliper 16 to be hydraulically controlled in order to clamp on the disc 15. The braking system 13 is provided with a hydraulic braking circuit 17, which is connected to all the calipers 16 and is provided with a brake pump 18 to raise the pressure in the hydraulic braking circuit 17 itself. The brake pump 18 is controlled by a brake pedal 19, which is mechanically connected to the brake pump 18 for directly acting on the brake pump 18, and is provided with a servo brake system 20 for amplifying the action of the brake pedal 19 and thus reducing the force which should be exerted on the brake pedal 19 itself.

Figure 2:
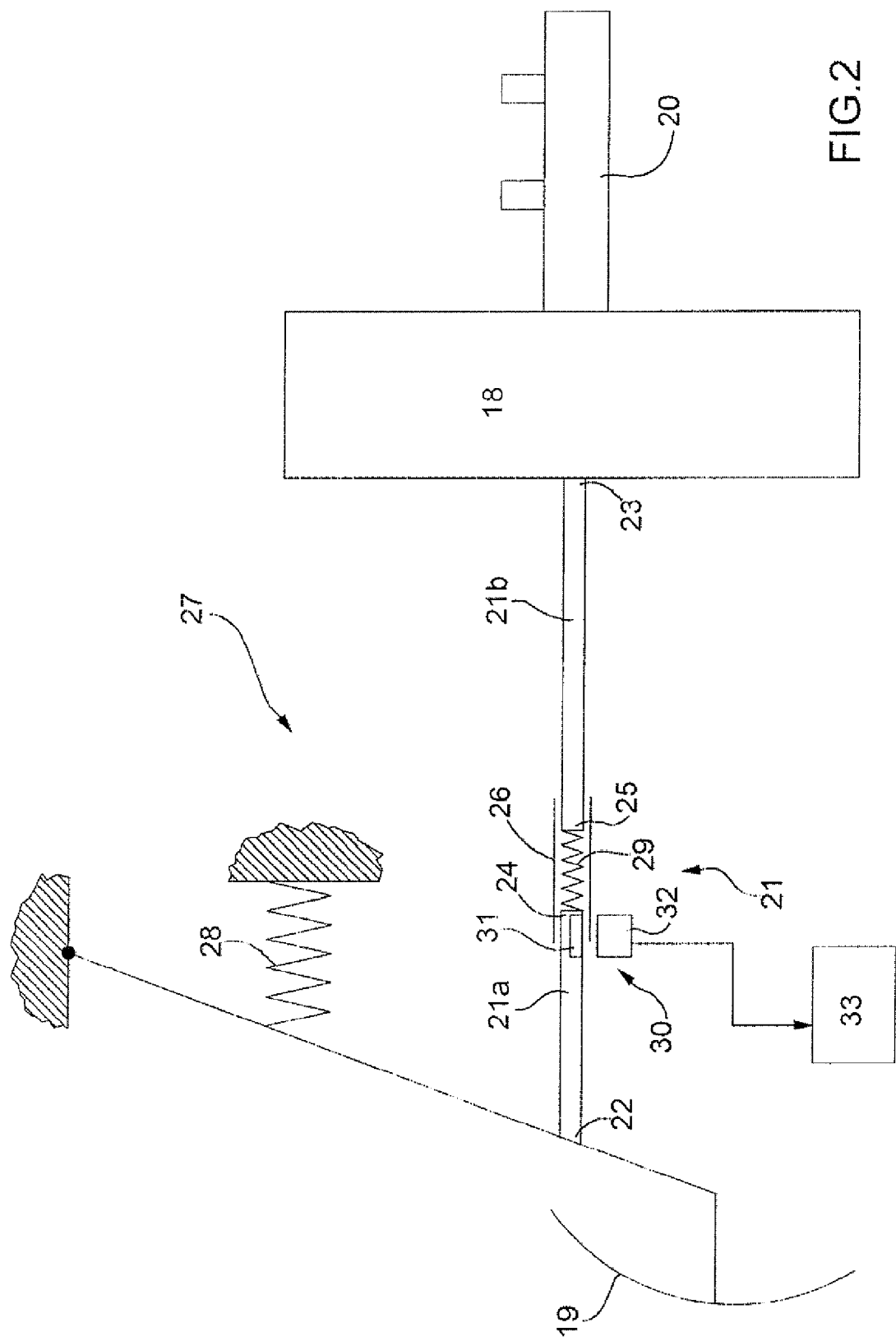
FIG. 2 is a diagrammatic view of part of the braking system in FIG. 1.

As shown in FIG. 2, the brake pedal 19 is hinged to a chassis of road vehicle 1 to rotate between a resting position (shown in FIG. 2), in which the braking torque applied to the road vehicle 1 is null, and a maximal braking position (not shown) in which the braking torque applied to road vehicle 1 is maximal. A connecting cap 21 is provided, which mechanically connects the brake pedal 19 to the brake pump 18 (by interposing the servo brake system 20) and has one end 22 integral to the brake pedal 19 and an opposite end 22 integral to the brake pump 18 (by interposing the servo brake system 20).

The connecting cap 21 is divided into two reciprocally independent parts 21a and 21b having two respective ends 24 and 25 facing each other; in other words, part 21a of the connecting cap 21 has the end 22 integral to the brake pedal 19 and the end 24, while part 21b of the connecting cap 21 has the end 23 opposite to end 22 integral to the brake pump 18 and the end 25. The two ends 24 and 25 facing each other of the two parts 21a and 21b of the connecting cap 21 are inserted into a tubular base 26 forming a coupling between the ends 24 and 25 themselves; according to three different, reciprocally equivalent embodiments, either both ends 24 and 25 are slidingly mounted inside the base 26, or the base 26 is integral to the end 24, while end 25 is slidingly mounted inside the base 26, or the base 26 is integral to the end 25, while end 24 is slidingly mounted inside the base 26. As previously mentioned, the function of the tubular base 26 is to make a coupling between the ends 24 and 25 by guiding the mutual movement away or towards the ends 24 and 25 while always maintaining the ends 24 and 25 themselves facing each other.

An elastic system 27 which pushes the brake pedal 19 towards the resting position is included; in the embodiment shown in FIG. 2, the elastic system 27 comprises a spring 28, which is directly coupled to the brake pedal 19 (i.e. is compressed between the brake pedal 19 and a chassis of the road vehicle 1), and a spring 29 which is interposed between the two parts 21a and 21b of the connecting cap 21 (i.e. is compressed between the end 24 and the end 25 and is inserted into the tubular base 26). According to a different embodiment (not shown), the elastic system 27 could comprise either the spring 28 only or the spring 29 only.

A position sensor 30 to read the position of the part 21a itself is coupled to the part 21a of the connecting cap 21 integral to the brake pedal 19. In the embodiment shown in FIG. 2, the position sensor 30 is mounted at an intermediate portion of the part 21a of the connecting cap 21; in other words, the position sensor 30 has a mobile slider 31 integral to part 21a and a fixed reader 32, which is arranged close to the mobile slider 31 for reading the position of the mobile slider 31. The position sensor 30 may include a mechanical connection between the mobile slider 31 and the fixed reader 32 (e.g. when the position sensor 30 is a potentiometer), or the position sensor 30 may be of the contactless type and therefore not include any mechanical connection between the mobile slider 31 and the fixed reader 32 (e.g. when the position sensor 30 is of the inductive type). Alternatively, the position sensor 30 could be mounted on the brake pedal 19 (i.e. the mobile slider 31 of the position sensor 30 is integral to the brake pedal 19) or the position sensor 30 could be mounted on the tubular base 26 (i.e. the mobile slider 31 of the position sensor 30 is integral to a portion of the spring 29) for detecting the reciprocal distance between the two ends 24 and 25 (i.e. for detecting the compression degree of spring 29).

Finally, a pilot system 33 is provided, which receives the reading from the position sensor 30 and is adapted to pilot the electric motor 8 as a generator for effecting a regenerative braking; in particular, the pilot system 33 uses the position of part 21a of the connecting cap 21 integral to the brake pedal 19 provided by the position sensor 30 for controlling the operation of the electric motor 8 as a generator, so that the braking torque absorbed by the electric motor 8 is inversely proportional to the distance existing between the two parts 21a and 21b of the connecting cap 21 (i.e. between the two ends 24 and 25 facing each other of parts 21a and 21b) In other words, the greater the distance between the two parts 21a and 21b (i.e. between the two ends 24 and 25), the lower the braking torque absorbed by the electric motor 8

The operation of the braking system 13 is described below according to FIG. 2.

When the driver does not press the brake pedal 19, the brake pedal 19 is pushed and maintained in the resting position (shown in FIG. 2) by the elastic system 27, at which the distance between the two parts 21a and 21b (i.e. between the two ends 24 and 25) is maximal. Under these conditions (i.e. when the distance between the two parts 21a and 21b is maximal), the reading provided by the position sensor 30 is higher than a predetermined threshold and the pilot system 33 does not pilot the electric motor 8 as a generator for creating a braking torque (or, in other words, the braking torque generated by the electric motor 8 is null)

When the driver starts depressing the brake pedal 19, the brake pedal 19 itself moves, compressing the springs 28 and 29 of the elastic system 27 and gradually approaching the two parts 21a and 21b (i.e. between the two ends 24 and 25); under these conditions, the pilot system 33 pilots the electric motor 8 as a generator for creating a gradually increasing braking torque according to the approach degree between the two parts 21a and 21b (i.e. the closer the two parts 21a and 21b, the greater the intensity of the braking torque absorbed by the electric motor 8 working as a generator). The maximal braking force absorbable by the electric motor 8 working as a generator may be obtained when the two parts 21a and 21b (i.e. the two ends 24 and 25) are at a minimum distance from each other (i.e. are very close but do not touch each other yet).

It is worth noting that until this moment, the movement of the brake pedal 19 does not determine any mechanical action of part 21b of the connecting cap 19, and thus on the brake pump 18. If the driver further depresses the brake pedal 19, the movement of the brake pedal 19 takes part 21 in contact with part 21b (i.e. takes end 24 in contact with end 25); from this moment, a further pressure on the brake pedal 19 (i.e. a further depressing of the brake pedal 19) is transmitted by part 21a to part 21b, and from this to the brake pump 18 of the hydraulic braking circuit 17, which thus raises the pressure in the hydraulic braking circuit 17 thus determining the operation of the disc brakes 14. In other words, in this circumstance, the braking system 13 behaves like a traditional braking system in which there is a direct mechanical connection (determined by joining the two parts 21 and 21b of the connecting cap 21) between the brake pedal 19 and the brake pump 18 of the hydraulic braking circuit 17.

Summarizing the above description, a discontinuity (i.e. a mechanical interruption), which is enclosed in the tubular base 26 and is coupled to the position sensor 30, is inserted along the connecting cap 21. When the driver depresses the brake pedal 19, the connecting cap 21 does not firstly act in a mechanical manner on the brake pump 18 due to the separation of part 21a of the connecting cap 21 from part 21b; only by applying a relatively high force on the brake pedal 19, the contact between the two parts 21a and 21b of the connecting cap 21 is determined, and thus the thrust is transmitted to the brake pump 18. The signal of position sensor 30 is sent to the pilot system 33 which pilots the electric motor 8 as a generator for effecting a regenerative braking; the resulting braking torque is managed so as to be approximately proportional to the signal of the position sensor 30, so that the driver may control the deceleration of road vehicle 1. When the two parts 21a and 21b of the connecting cap 21 are in contact, the brake pedal 19 mechanically acts on the brake pump 18 thus activating the disc brakes 14; in this circumstance, the electric motor 8 is piloted to absorb all the braking torque made available by the regeneration to which the disc brakes 14 will add the torque lacking in order to brake the road vehicle 1.

The disc brakes 14 may have a smaller size as compared to a similar conventional braking system because part of the braking energy is supplied by the electric motor 8. In some cases, the battery connected to the electric motor 8 is fully charged (i.e. is no longer capable of storing further electricity) and thus the electricity generated by the electric motor 8 with the regenerative braking is in excess; in this cases, the electricity generated by the electric motor 8 with the regenerative braking may be dissipated in the form of heat by using one or more electric resistors.

An embodiment of the above-described braking system 13 has many advantages. First, an embodiment of the above-described braking system 13 is simple and rapid to be implemented even in an existing vehicle 1, because it is entirely similar to a traditional braking system and the only structural change to be made includes cutting the connecting cap 21 into two parts 21 and 21b. Furthermore, an embodiment of the above-described braking system 13 is particularly compact, because it only requires the insertion of tubular base 26, position sensor 30 and elastic system 27, and these components are small in size and easily placeable because they may correctly work in several positions.

The braking torque absorbed by the electric motor 8 working as a generator may be maximized before the intervention of the mechanical disc brakes 14 and thereby the energy efficiency may be maximized. Moreover, the value of the braking torque absorbed by the electric motor 8 working as a generator varies from zero to a maximal value and is controlled by the driver depressing the brake pedal 19 (i.e. intuitively and ergonomically).

Finally, in an embodiment of the above-described braking system 13, the mechanical connection between the brake pedal 19 and the brake pump 18 which raises the pressure in the braking circuit is maintained, and therefore the braking system 13 intrinsically has the same safety degree as a traditional braking system. In other words, in case of failure to the position sensor 30 or the pilot system 33, and therefore in the absence of braking action of the electric motor 8, the only drawback encountered by the user is a feeling of longer idle stroke of the brake pedal 19 (i.e. the brake discs 14 will not work until part 21a of the connecting cap 21 comes in contact with part 21b).

One or more of the other methods described below may be used either alternatively or in combination with the above for activating/deactivating and adjusting the action of the electric motor 8 for effecting a regenerative braking.

An ON/OFF type switch which is used to recognize the step of braking, e.g. for controlling the switching on of the brake lights or for managing the servo controlled transmission 7, is coupled to the brake pedal 19; such a switch may also be used to control the activation and deactivation of the regenerative braking, which in this case is of the ON/OFF type.

A position sensor which is used to control the activation and deactivation of the regenerative braking is coupled to an accelerator pedal; in particular, when the accelerator pedal is released, a threshold (a reference movement value of the acceleration pedal) may be determined, beyond which the regenerative braking is activated. Alternatively, then the accelerator pedal is released, a reference releasing speed threshold of the accelerator pedal may be determined, beyond which the regenerative braking is activated.

The brake oil pressure value in the hydraulic braking circuit 17 may be used to activate/deactivate the regenerative braking; in other words, the regenerative braking is activated when the brake oil pressure is higher than a threshold value and the intensity of the braking torque absorbed by the electric motor 8 is proportional to the brake oil pressure. The brake oil pressure may be measured by a dedicated pressure sensor or a reading carried out by an ABS system and normally made available over the CAN network may be used.

In an embodiment of the above-described systems, there is always a concomitance between the regenerative braking action operated by the electric motor 8 and the dissipative braking action operated by the disc brakes 14, i.e. both the regenerative braking action and the dissipative braking action are simultaneously activated. When a relatively modest braking torque is required (i.e. which may be generated only by the electric motor 8), the dissipative braking action operated by the disc brakes 14 may be either limited or suppressed by using the relief valves of the ABS system which locally remove the pressure from the disc brakes 14.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. Braking system for a vehicle to control a regenerative braking; the braking system comprises:
   a plurality of hydraulically operated mechanical brakes;
   a hydraulic braking circuit connected to the mechanical brakes;
   a brake pump to raise pressure in the hydraulic braking circuit;
   a brake pedal mobile between a resting position and a maximal braking position;
   an elastic system pushing the brake pedal towards the resting position;
   a connecting cap, which mechanically connects the brake pedal to the brake pump, has a first end integral to the brake pedal and a second end, opposed to the first end, integral to the brake pump, and is divided in two independent parts, having two respective third and fourth ends facing each other;
   a position sensor to read the position of a part of the connecting cap integral to the brake pedal;
   an energy recovery system comprising at least an electric machine to work as a generator; and a pilot system to pilot the electric machine of the energy recovery system for effecting a regenerative braking and uses the position of the part of the connecting cap integral to the brake pedal detected by the position sensor for controlling the operation of the electric machine of the energy recovery system as a generator, so that the braking torque absorbed by the electric machine of the energy recovery system is inversely proportional to the distance existing between the two parts of the connecting cap and the maximal braking force absorbable by the electric machine working as a generator is obtained when the two parts of the connecting cap are at a minimum distance from each other;

wherein the elastic system comprises a first spring interposed between the two parts of the connecting cap and is compressed between the third and fourth ends of the two parts of the connecting cap; and wherein the position sensor has a mobile slider integral to an element of the elastic system.

2. Braking system according to claim 1 and comprising a tubular base, forming a coupling between the third and the fourth ends, facing each other, of the two parts of the connecting cap by guiding the reciprocal movement of approaching and moving away of the third and the fourth ends maintaining the third and the fourth ends facing each other.

3. Braking system according to claim 2, wherein the first spring is arranged inside the tubular base.

4. Braking system according to claim 1, wherein the elastic system comprises a second spring which is directly coupled to the brake pedal.

5. Braking system according to claim 1, wherein the mobile slider is integral to the brake pedal.

6. Braking system according to claim 1, wherein the mobile slider is integral to the part of the connecting cap integral to the brake pedal.

7. Braking system for a vehicle to control a regenerative braking; the braking system comprises:
   a plurality of hydraulically operated mechanical brakes;
   a hydraulic braking circuit connected to the mechanical brakes;
   a brake pump to raise pressure in the hydraulic braking circuit;
   a brake pedal mobile between a resting position and a maximal braking position;
   an elastic system pushing the brake pedal towards the resting position;
   a connecting cap, which mechanically connects the brake pedal to the brake pump, has a first end integral to the brake pedal and a second end, opposed to the first end, integral to the brake pump, and is divided in two independent parts, having two respective third and fourth ends facing each other;
   a position sensor to read the position of a part of the connecting cap integral to the brake pedal; and
   a pilot system to pilot an energy recovery system for effecting a regenerative braking and uses the position of the part of the connecting cap integral to the brake pedal detected by the position sensor for controlling the operation of the energy recovery system, so that the braking torque absorbed by the energy recovery system is inversely proportional to the distance existing between the two parts of the connecting cap;
   wherein the elastic system comprises a first spring interposed between the two parts of the connecting cap and is compressed between the third and fourth ends of the two parts of the connecting cap; and
   wherein the position sensor has a mobile slider integral to an element of the elastic system.

8. Braking system according to claim 7 and comprising a tubular base, forming a coupling between the third and the fourth ends, facing each other, of the two parts of the connecting cap by guiding the reciprocal movement of approaching and moving away of the third and the fourth ends maintaining the third and the fourth ends facing each other.

9. Braking system according to claim 8, wherein the first spring is arranged inside the tubular base.

10. Braking system according to claim 7, wherein the elastic system comprises a second spring which is directly coupled to the brake pedal.

11. Braking system according to claim 7, wherein the energy recovery system comprises at least an electric machine to work as a generator.

* * * * *